(12) United States Patent
Ho (10) Patent No.: US 6,419,179 B1
(45) Date of Patent: Jul. 16, 2002

(54) REEL DEVICE WITH CABLE GUIDING UNIT

(76) Inventor: Chun-Chin Ho, No. 5-5, Szu-Kung-Pu, Chung-Pu Hsiang, Chiayi Hsien (TW)

( * ) Notice: Subject to any disclaimer, the term of this patent is extended or adjusted under 35 U.S.C. 154(b) by 0 days.

(21) Appl. No.: 09/784,390

(22) Filed: Feb. 15, 2001

(51) Int. Cl.$^7$ ............................................... B65H 23/04
(52) U.S. Cl. ................ 242/396.5; 242/153; 242/155 R; 242/419.8
(58) Field of Search ........................... 242/396.5, 419.5, 242/419.8, 151, 155 R, 156.1, 153, 154

(56) References Cited

U.S. PATENT DOCUMENTS 3,386,679 A  *  6/1968  Foulon et al. ............ 242/419.5

* cited by examiner

*Primary Examiner*—John Q. Nguyen
(74) *Attorney, Agent, or Firm*—Trop, Pruner & Hu, P.C.

(57) ABSTRACT

A reel device includes a housing, a spool, a cable guiding unit, and a cable. The housing has a pair of spaced-apart lateral side wall sand a cable winding space formed between the lateral side walls. The cable winding space has a rear opening. The spool is disposed transversely between the lateral side walls, and is mounted rotatably on the side walls. The cable guiding unit is mounted on the housing, and is disposed in the cable winding space adjacent to the rear opening. The cable is wound on the spool, and has a distal end extending rearwardly through the cable guiding unit. The cable guiding unit includes a cable engaging member which is operable to move between an engaging position, in which the cable guiding unit applies a friction force on the cable so as to retard movement of the cable relative to the cable guiding unit, and a disengaging position, in which the friction force is released such that the cable guiding unit ceases to retard movement of the cable relative to the cable guiding unit.

4 Claims, 9 Drawing Sheets

REEL DEVICE WITH CABLE GUIDING UNIT

BACKGROUND OF THE INVENTION

1. Field of the Invention

The present invention relates to a reel device, more particularly to a reel device having a cable guiding unit that is capable of maintaining a cable in a tensed state and of guiding the cable such that the cable can be wound without tangling with itself.

2. Description of the Related Art

Figure 1:
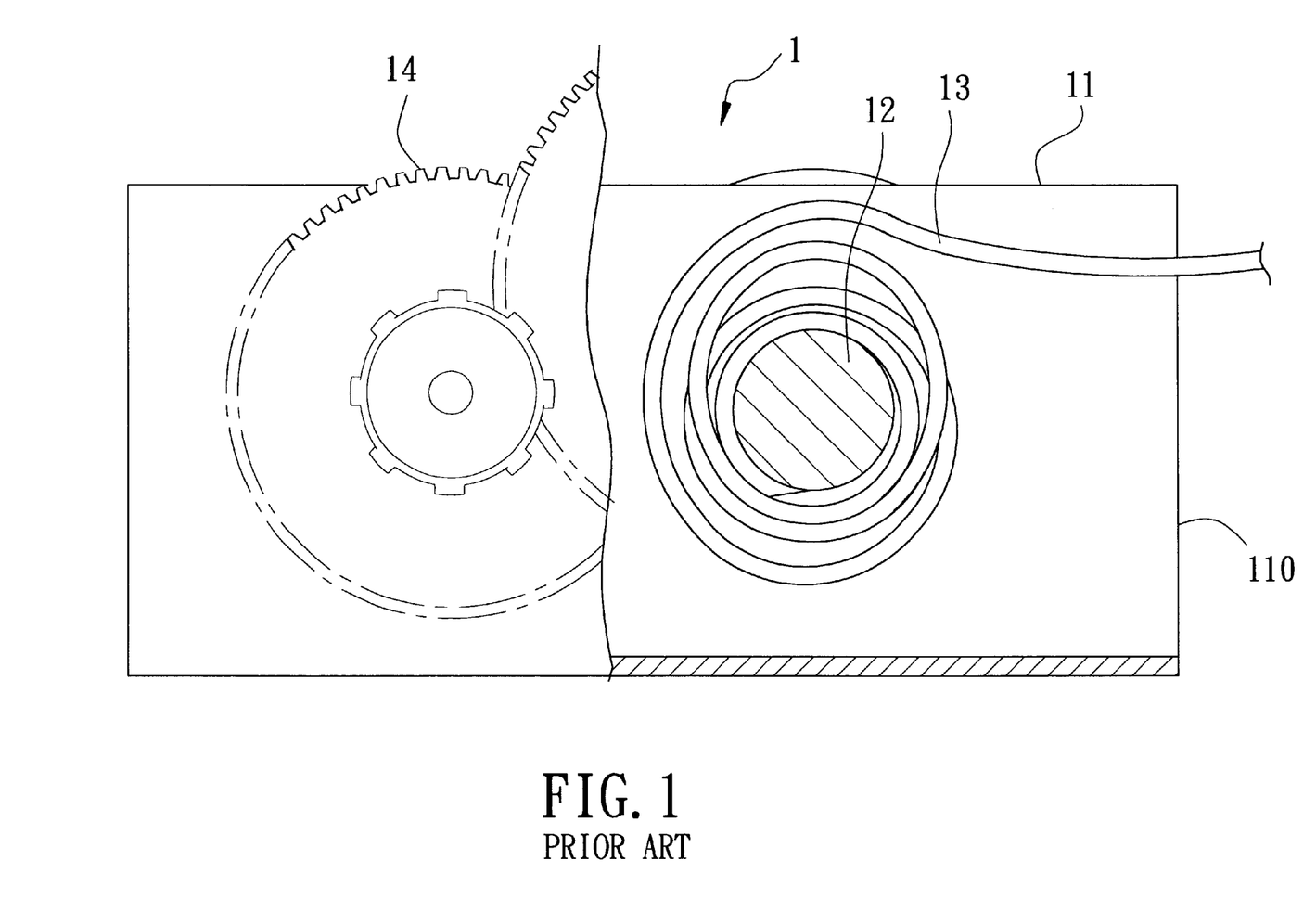
FIG. 1 fragmentary partly sectional view illustrating a conventional reel device.
Figure 2:
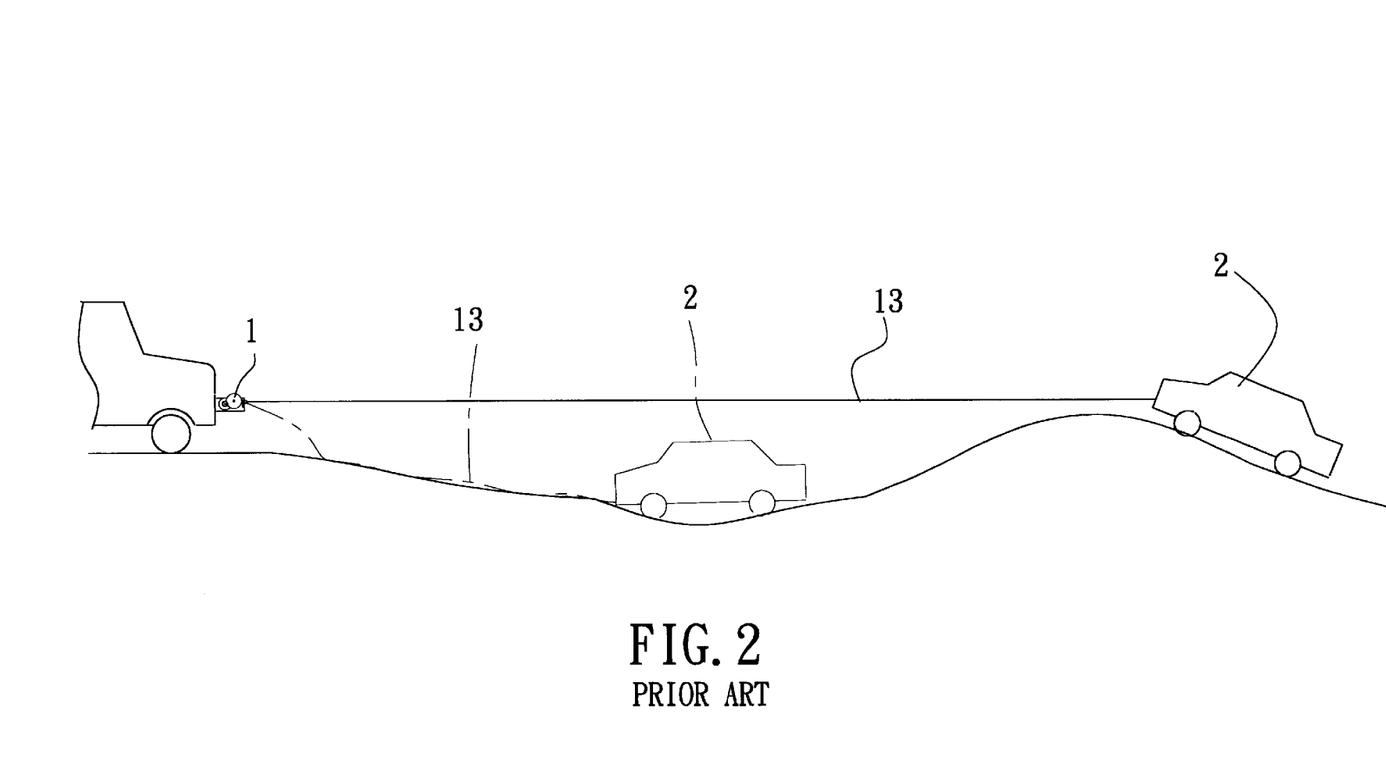
FIG. 2 illustrates the conventional reel device when used for pulling a car to move along an uneven ground surface.

FIG. 1 illustrates a conventional reel device 1 which includes a housing 11, a spool 12 journalled in the housing 11, and a cable 13 wound on the spool 12. The cable 13 has a distal end that extends out of the housing 11 via a rear opening 110 of the latter. The spool 12 is coupled to a drive source via a speed-reduction gear set 14. To unwind the cable 13 from the spool 12, the distal end of the cable 13 is pulled away from the rear opening 110 of the housing 11. On the other hand, when it is desired to wind the cable 13 on the spool 12, the drive source is activated to cause rotation of the spool 12 in a direction for winding the cable 13 thereon. It is found that the cable 13 could tangle with itself during winding on the spool 12 in the case the cable 13 is in a loose and non tensioned state. This prevents smooth unwinding of the cable 13 when the cable 13 is to be subsequently unwound from the spool 12. Referring to FIG. 2, when the cable 13 is connected to a heavy object, such as a car 2, and is wound to pull the car 2 to move along a downward slope on an uneven ground surface, the speed of the car 2 could be faster than the rate in which the cable 13 is wound on the spool. At this time, the cable 13 will be in a loose and non-tensioned state.

SUMMARY OF THE INVENTION

Therefore, the main object of the present invention is to provide a reel device having a cable guiding unit that is capable of maintaining a cable in a tensed state and of guiding the cable such that the cable can be wound without tangling with itself.

Accordingly, the reel device of the present invention includes a housing, a spool, a cable guiding unit, and a cable. The housing has a pair of spaced-apart lateral side walls and a cable winding space formed between the lateral side walls. The cable winding space ha.3 a rear opening. The spool is disposed transversely between the lateral side walls, and is mounted rotatably on the side walls. The cable guiding unit is mounted on the housing, and is disposed in the cable winding space adjacent to the rear opening. The cable is wound on the spool, and has a distal end extending rearwardly through the cable guiding unit. The cable guiding unit includes a cable engaging member which is operable to move between an engaging position, in which the cable guiding unit applies a friction force on the cable so as to retard movement of the cable relative to the cable guiding unit, and a disengaging position, in which the friction force is released such that the cable guiding unit ceases to retard movement of the cable relative to the cable guiding unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
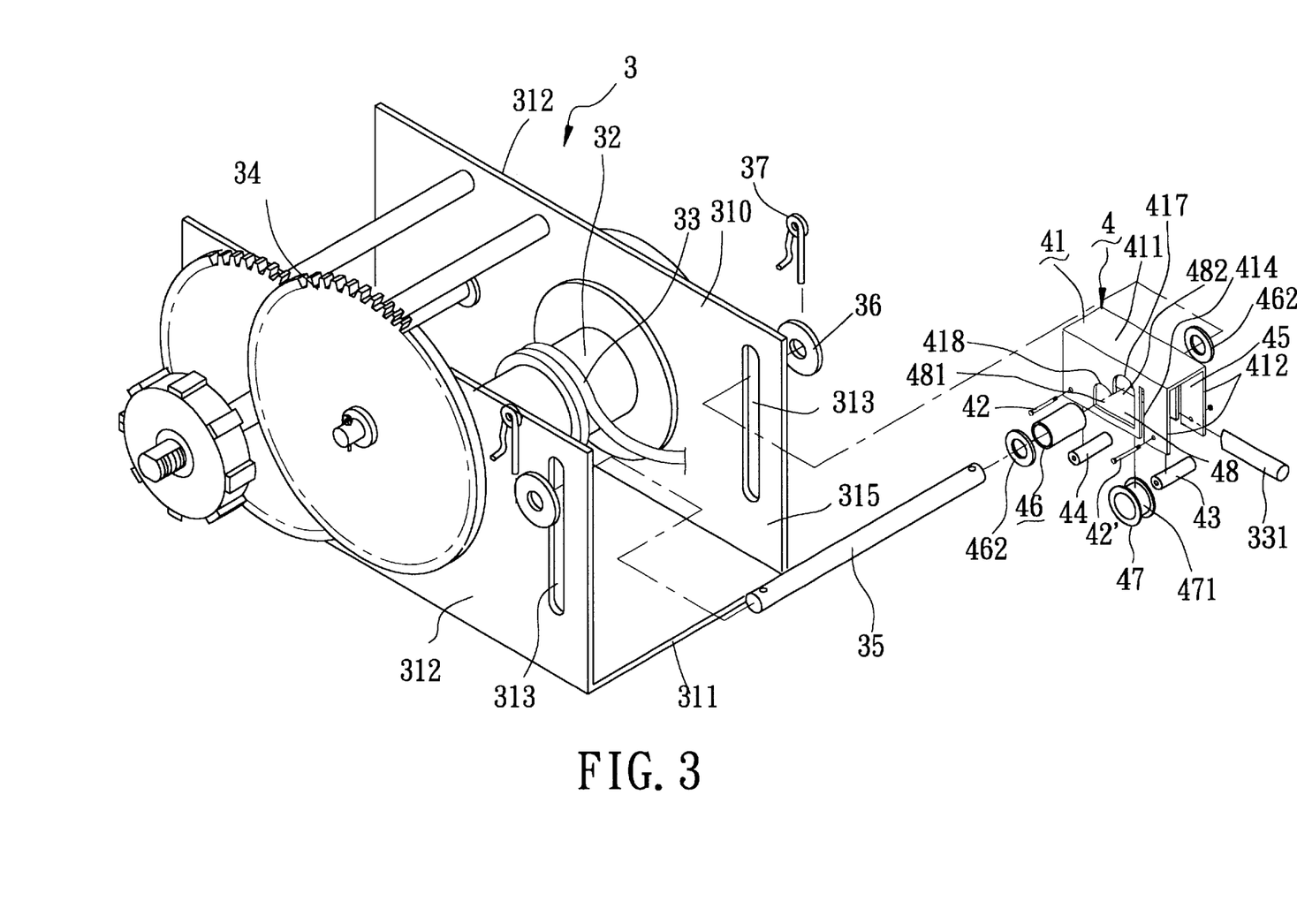
FIG. 3 is an exploded perspective view illustrating a preferred embodiment of the reel device of the present invention.
Figure 4:
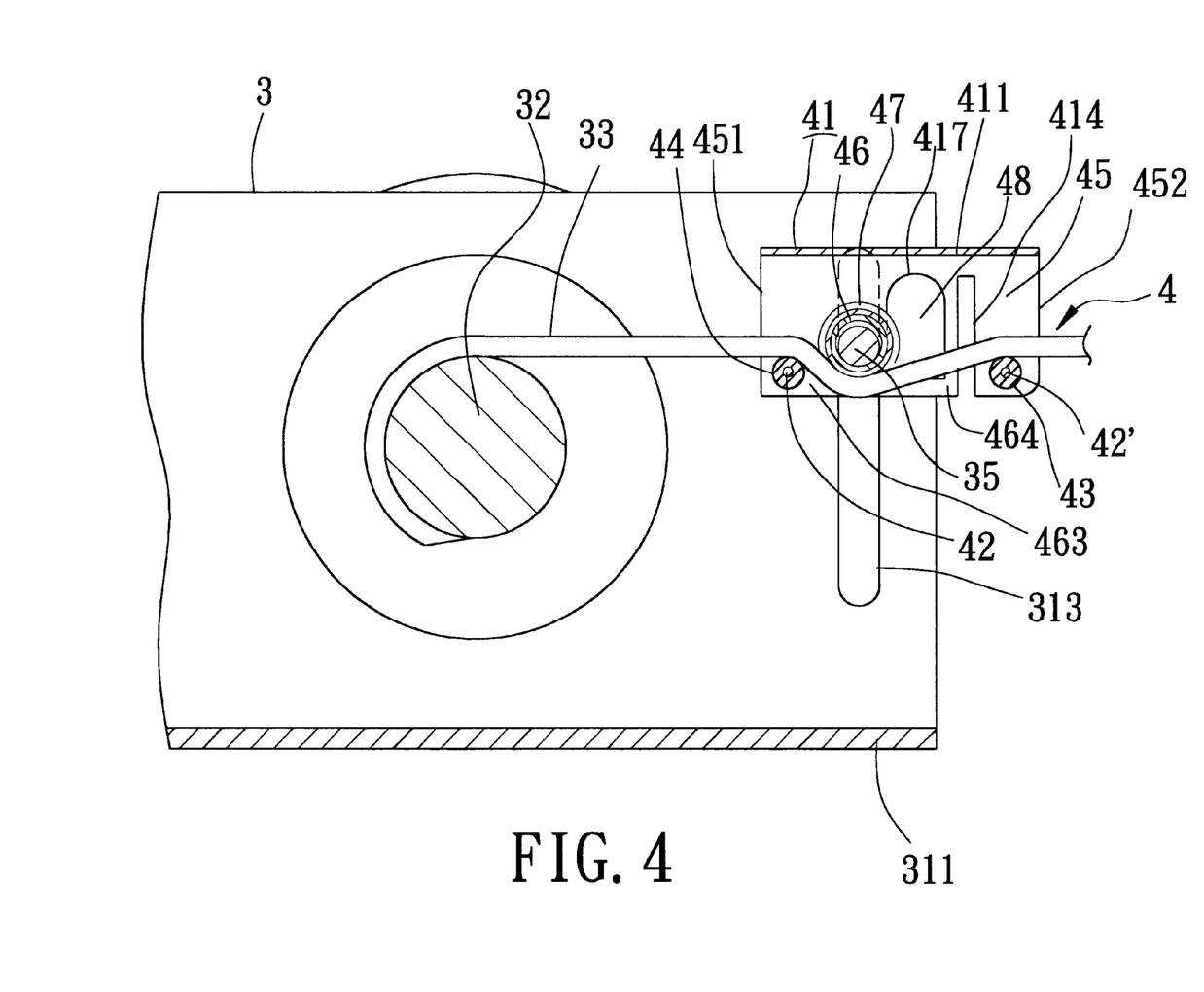
FIG. 4 is a fragmentary sectional view of the preferred embodiment, where a cable guiding unit is shown to be in an engaging position.
Figure 5:
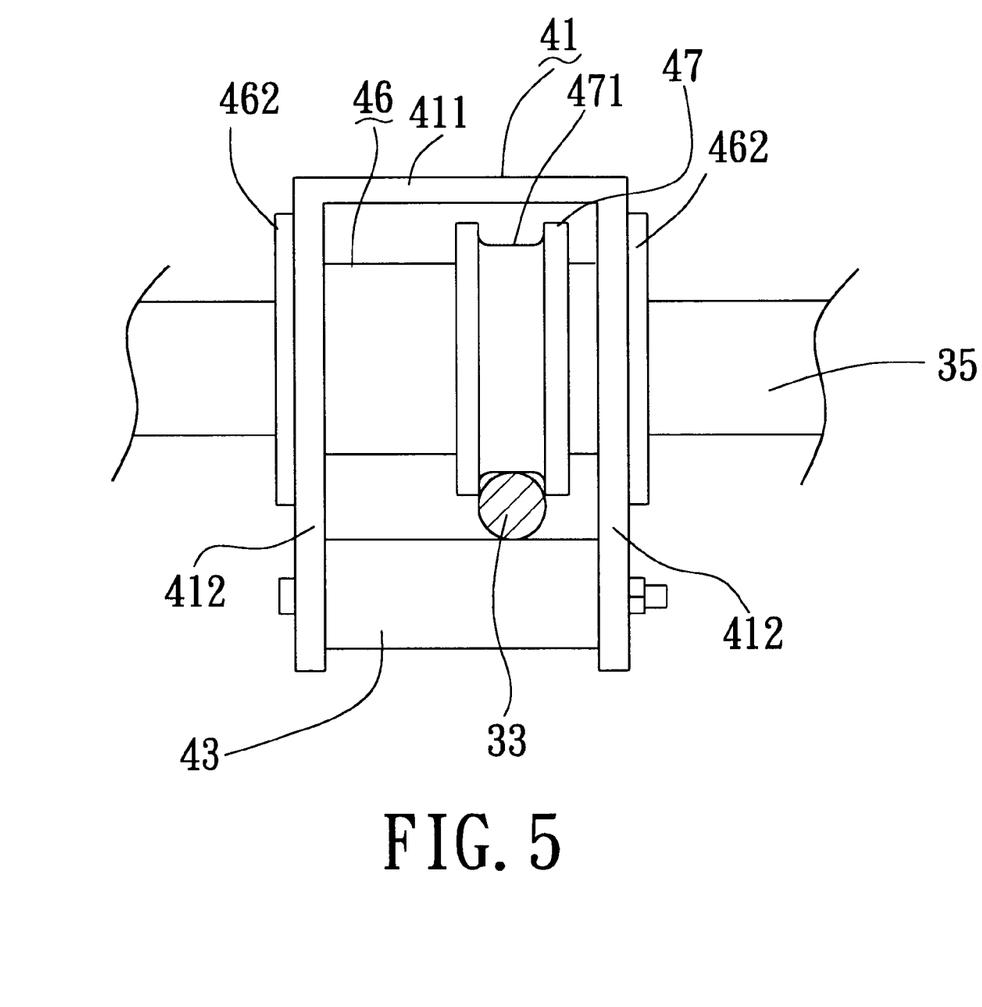
FIG. 5 is an enlarged rear view of the cable guiding unit of the reel device of the preferred embodiment.

Referring to FIG. 3 to 5, the preferred embodiment of a reel device according to the present invention is shown to include a housing 3, a spool 32 journalled in the housing 3, a cable guiding unit 4, and a horizontal slide rod 35 for mounting the cable guiding unit 4 in the housing 3.

The housing 3 has a pair of spaced-apart and parallel lateral side walls 312 and a bottom wall 311 which cooperatively confine a cable winding space 310 with a rear opening 315. The spool 32 is disposed in the cable winding space 310, and is mounted rotatably on the lateral side walls 312. The cable 33 is wound on the spool 32, and has a distal end 331 extending out of the housing 3 via the rear opening 315. The spool 32 is coupled to a drive source (not shown) via a gear set 34 mounted on the lateral side walls 312. The drive source can be activated for driving rotation of the spool 32 in a direction for winding the cable 33 thereon. The lateral sidewalls 312 are formed with vertically extending slots 313 which are registered with each other. The slide rod 35 has two opposite ends extending respectively through the slots 313. Each of the opposite ends of the slide rod 35 is sleeved with a retaining ring 36, and engages a retaining pin 37 for mounting the slide rod 35 slidably on the lateral side walls 312 so as to be slidable along the slots 313.

The cable guiding unit 4 includes a guiding seat 41 having a top plate 411 and a parallel pair of side plates 412 extending downwardly from the top plate 411 so as to cooperate with the top plate 411 to confine a cable passage 45 with an open front passage end 451 proximate to the spool 32 and an open rear passage end 452 distal to the spool 32. Each of the side plates 412 is formed with a slit 414 which extends upwardly from a lower edge of the respective side plate 412 so as to divide the respective side plate 412 into front and rear plate portions. The front plate portion of each of the side plates 412 is formed with an adjustment hole 48 which includes a narrower hole portion 481 and a wider hole portion 482 communicated with the narrower hole portion 481. The adjustment holes 48 in the side plates 412 are registered with each other, and have the slide rod 35 extending therethrough such that the guiding seat 41 is slidable along the slide rod 35 between the lateral side walls 312 of the housing 3. The narrower hole portion 481 of the adjustment hole 48 in each of the side plates 412 has an upwardly curving upper periphery 418. The wider hole portion 482 of the adjustment hole 48 also has an upwardly curving upper periphery 417 which is disposed at a level higher than the upper periphery 418 of the narrower hole portion 481. An elongated front guiding roller 44 is disposed transversely in the cable passage 45 adjacent to the front passage end 451, and is mounted rotatably on the side plates 412 by means of a front roller axle 42. An elongated rear guiding roller 43 is disposed transversely in the cable passage 45 adjacent to the rear passage end 452, and is mounted rotatably on the side plates 412 by means of a rear roller axle 42'. An engaging roller 46 is disposed in the cable passage 45 between the front and rear guiding rollers 44, 43, and is sleeved on the slide rod 35. A pair of annular stop plates 462 are sleeved on the slide rod 35, and are sealed to two opposite ends of the engaging roller 46. The stop plates 462 are disposed on two opposite lateral sides of the side plates 412, and have a size larger than that of the adjustment holes 48 to prevent removal of the engaging roller 46 from the guiding seat 41. A first clearance 463 is formed between the engaging roller 46 and the front guiding roller 44. A second clearance 464 is formed between the engaging roller 46 and the rear guiding roller 43. A contact wheel 47 is sleeved on the engaging roller 46, and has an outer periphery formed with an annular groove 471 for accommodating the cable 33.

The distal end 331 of the cable 33 extends through the front and rear passage ends 451, 452 of the cable passage 45 of the guiding seat 41, and through the first and second clearances 463, 464. The cable 33 extends immediately over the front and rear guiding rollers 44, 43 so as to be in contact therewith, and below the engaging roller 46. When the cable 33 is to be wound on the spool 32, the engaging roller 46 is moved into the narrower hole portions 481 of the adjustment holes 48 to be disposed in an engaging position. In this state, the engaging roller 46 is forced upward by the cable 33 to abut against the upper peripheries 418 of the narrower hole portions 481. The cable 33 is bent within the guiding seat 41, and the guiding unit 4 applies a friction force to the cable 33 to retard movement of the cable 33 relative to the guiding seat 41 and to maintain the cable 33 in a tensed state.

Figure 6:
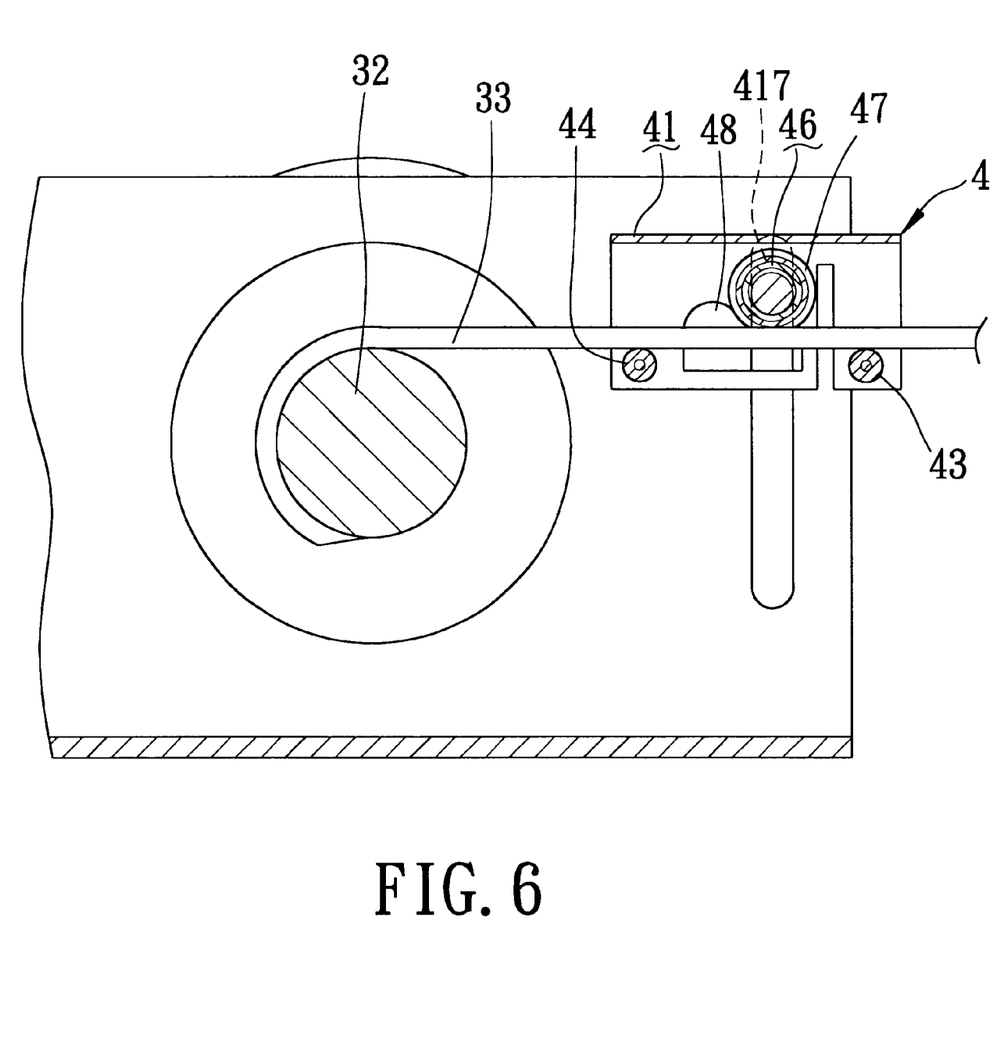
FIG. 6 is another fragmentary sectional view of the preferred embodiment, where the cable guiding unit is shown to be in a disengaging position.

Referring to FIGS. 3 and 6, when it is desired to unwind the cable 33, the engaging roller 46 is moved into the wider hole portions 482 so as to be disposed in a disengaging position. In this state, the part of the cable 33 within the guiding seat 4 is substantially straight, and the engaging roller 46 is forced upwardly to abut against the upper peripheries 417 of the wider hole portions 482. As such, the friction force acting on the cable 33 is released, and the guiding unit 4 ceases to retard movement of the cable 33 relative to the guiding seat 41 so as to facilitate unwinding of the cable 33 from the spool 32.

Figure 7:
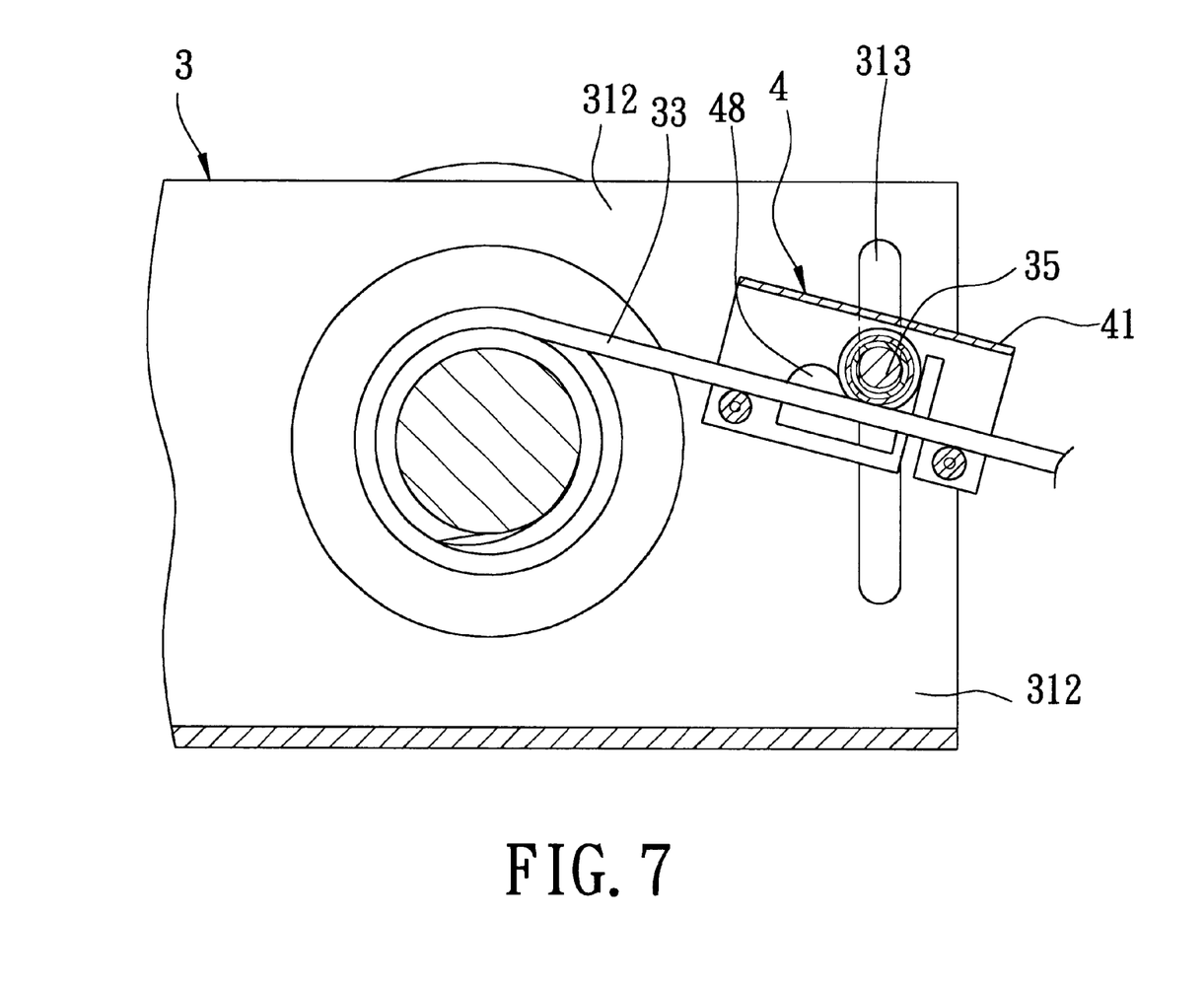
FIG. 7 is still another fragmentary sectional view of the preferred embodiment, where the cable guiding unit is shown to be in an inclined and disengaging position.

Referring to FIG. 7, since the guiding seat 41 is mounted on the slide rod 35, which is slidable along the slots 313 in the side walls 312 of the housing 3, the guiding seat 41 is slidable with the slide rod 35 along the slots 313. When the cable 33 turns downward during unwinding thereof, the guiding seat 41 automatically tilts at an angle to keep the corresponding part of the cable 33 straight.

Figure 8:
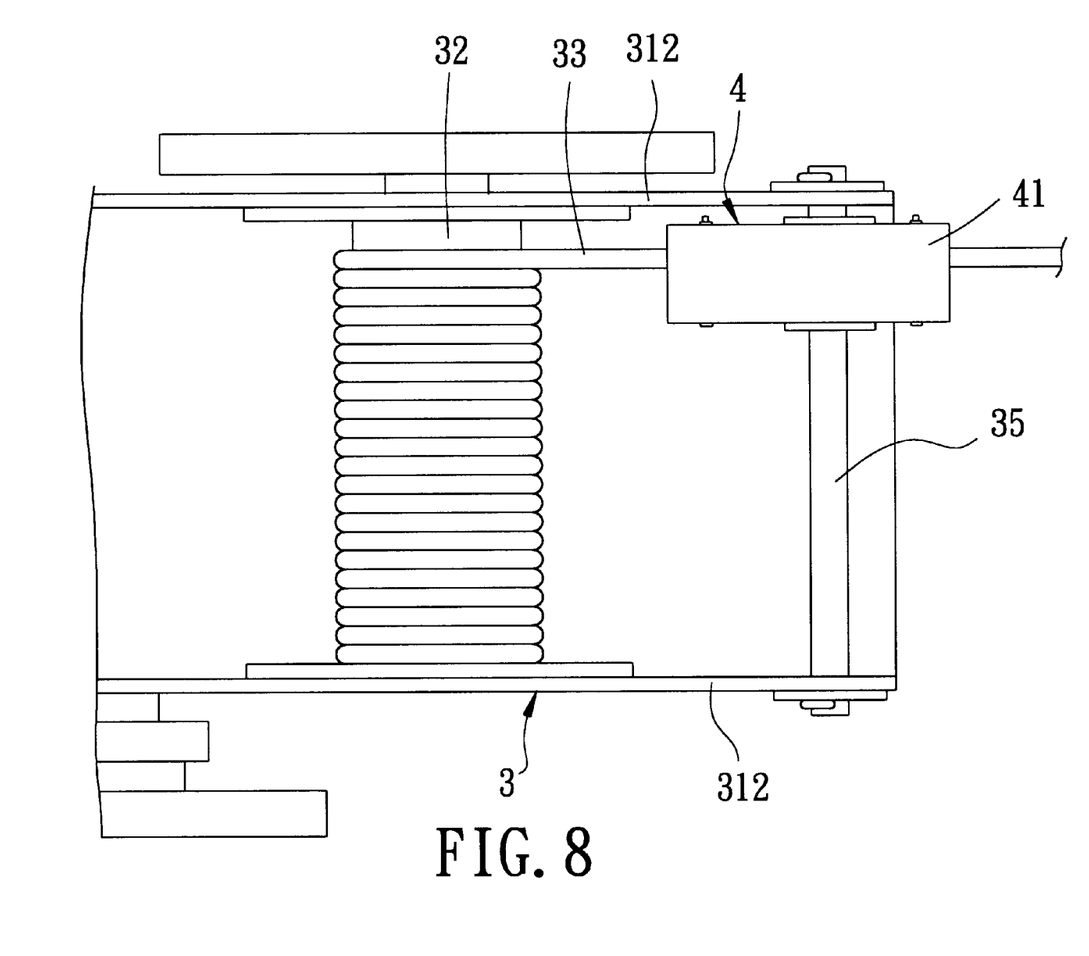
FIG. 8 is a top view of the preferred embodiment.

Referring to FIG. 8, the guiding seat 41 is slidable automatically along the slide rod 35 between the lateral side walls 312 of the housing 3, thereby permitting winding of the cable 33 on the spool 32 in a regulated manner to prevent the cable 33 from tangling with itself.

Figure 9:
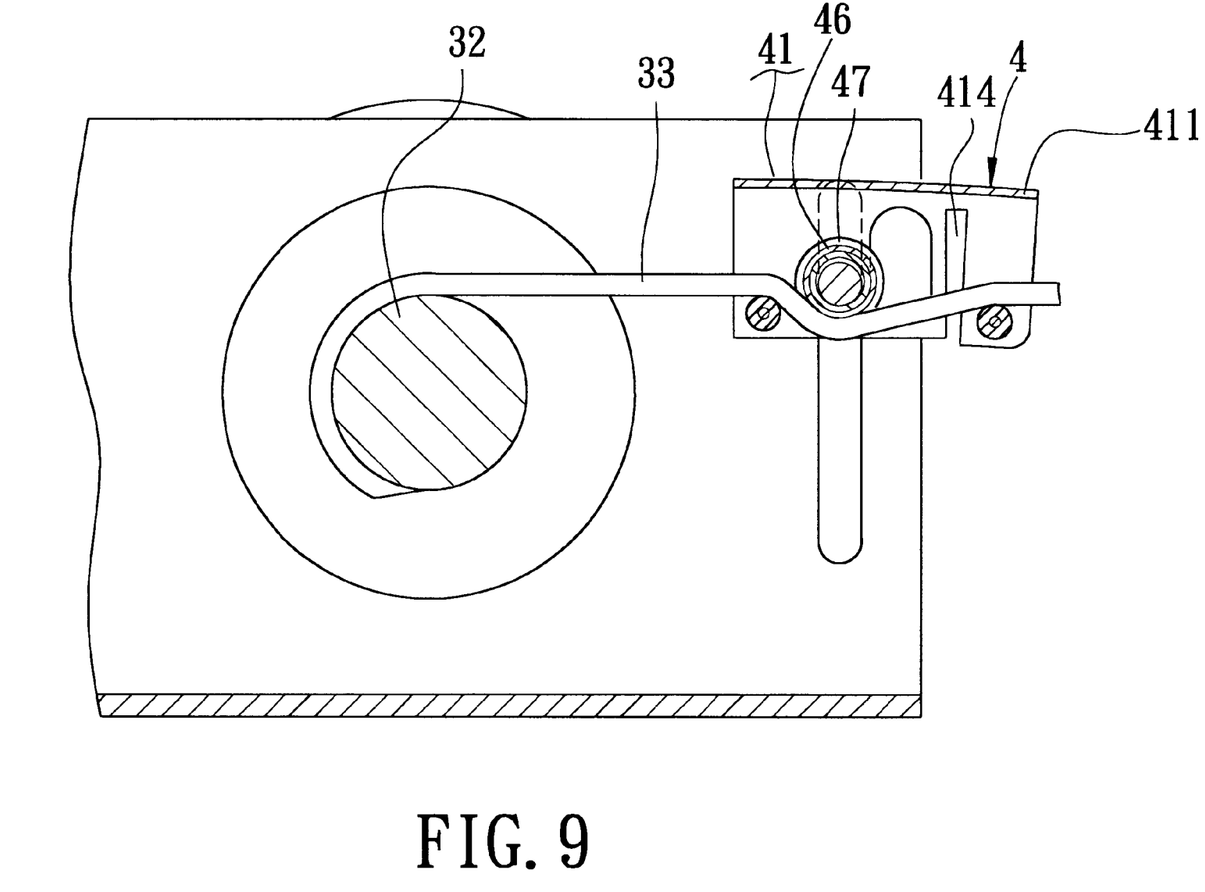
FIG. 9 is yet another fragmentary sectional view of the preferred embodiment, where a guiding seat is shown to be in a deformed state.

Referring to FIG. 9, with the provision of the slits 414 to impart resiliency to the guiding seat 41, in the case the engaging roller 46 is accidentally disposed in the engaging position during unwinding of the cable 33, and the guiding seat 41 is applied with a stress, the slits 414 serve as a buffer to enable bending of the guiding seat 41 so as to prevent damage to the same.

Accordingly, by simply disposing the engaging roller 46 in the narrower hole portions 481 of the adjustment holes 48, the cable 33 can be maintained at a tensed state to permit winding thereof at a rate corresponding to that of the rotation of the spool 32. Tangling of the cable 33 with itself can be avoided, and the cable 33 can be wound on the spool 32 in a regulated manner to facilitate subsequent unwinding thereof.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:
1. A reel device comprising:
   a housing having a pair of spaced-apart lateral side walls and a cable winding space formed between said lateral side walls, said cable winding space having a rear opening;
   a spool disposed transversely between said lateral side walls and mounted rotatably on said side walls;
   a cable guiding unit mounted on said housing and disposed in said cable winding space adjacent to said rear opening;
   a cable wound on said spool and having a distal end extending rearwardly through said cable guiding unit;
   said cable guiding unit including a cable engaging member which is operable to move between an engaging position, in which said cable guiding unit applies a friction force on said cable so as to retard movement of said cable relative to said cable guiding unit, and a disengaging position, in which the friction force is released such that said cable guiding unit ceases to retard movement of said cable relative to said cable guiding unit;
   wherein said lateral side walls of said housing are formed with vertically extending slots which are registered with each other;
   a horizontal slide rod which has two opposite ends extending respectively through said slots and slidable along said slots, said cable guiding unit being mounted slidably on said slide rod so as to be slidable along said slide rod between said lateral side walls to said housing;
   wherein said cable guiding unit further includes:
      a guiding seat having a parallel pair of side plates and a top plate which interconnects said side plates and which cooperates with said side plates to confine a cable passage with open front and rear passage ends, said side plates being formed with adjustment holes which are registered with each other and which permit extension of said slide rod therethrough for mounting said guiding seat on said slide rod;
      an elongated front guiding roller disposed traversely in said cable passage adjacent to said front passage end and mounted rotatably on said side plates; and
      an elongated rear guiding roller disposed transversely in said cable passage adjacent to said rear passage end and mounted rotatably on said side plates; and said cable engaging member including an engaging roller disposed in said cable passage between said front and rear guiding rollers and sleeved rotatably on said slide rod, said engaging roller cooperating with said front guiding roller to define a first clearance, and further cooperating with said rear guiding roller to define a second clearance, said cable extending through said first and second clearances within said cable passage so as to be in contact with said front and rear guiding rollers, said engaging roller having two opposite ends extending respectively into said adjustment holes in said side plates and being movable in said adjustment holes between said engaging and disengaging positions.

2. The reel device as claimed in claim 1, wherein each of said adjustment holes in said side plates of said guiding seat has a narrower hole portion proximate to said front guiding roller, and a wider hole portion communicated with said narrower hole portion and proximate to said rear guiding roller, said engaging roller being disposed in said narrower hole portion when in the engaging position, and being disposed in said wider hole portion when in the disengaging position.

3. The reel device as claimed in claim 2, wherein said cable extends over said front and rear guiding rollers and below said engaging roller, said narrower hole portion of each of said adjustment holes having an upwardly curving upper periphery, said wider hole portion of each of said adjustment holes having an upwardly curving upper periphery which is disposed at a level higher than said upper periphery of said narrower hole portion.

4. The reel device as claimed in claim 2, wherein each of said side plates of said guiding seat has a lower edge, and is formed a slit extending upwardly from said lower edge to impart resiliency to said guiding seat, said slits in said side plates being disposed between said front and rear guiding rollers.

\* \* \* \* \*